(12) United States Patent
Paul et al.

(10) Patent No.: US 8,123,442 B2
(45) Date of Patent: Feb. 28, 2012

(54) EXPANDABLE MULTI-FLUTE REAMER WITH TAPERED PIN

(75) Inventors: Marcus Paul, Nuremberg (DE); Xaver Spichtinger, Oberviechtach (DE); Thomas Bobos, Morton Grove, IL (US)

(73) Assignee: Kennametal Inc., Latrobe, PA (US)

( * ) Notice: Subject to any disclaimer, the term of this patent is extended or adjusted under 35 U.S.C. 154(b) by 358 days.

(21) Appl. No.: 12/412,404

(22) Filed: Mar. 27, 2009

(65) Prior Publication Data
US 2010/0247257 A1  Sep. 30, 2010

(51) Int. Cl.
*B23D 77/00* (2006.01)
(52) U.S. Cl. .......... 408/59; 408/153; 408/156; 408/158; 408/161; 408/227
(58) Field of Classification Search .......... 408/153–154, 408/156–159, 161, 173, 180, 227, 229–230, 408/56, 57, 59
See application file for complete search history.

(56) References Cited

U.S. PATENT DOCUMENTS

| | | | | |
|---|---|---|---|---|
| 2,093,742 A * | 9/1937 | Staples | | 408/156 |
| 2,093,986 A * | 9/1937 | Staples | | 408/144 |
| 4,086,733 A * | 5/1978 | Vig | | 451/48 |
| 4,705,435 A | 11/1987 | Christoffel | | |
| 5,238,335 A * | 8/1993 | Nomura | | 408/59 |
| 6,575,672 B1 * | 6/2003 | Maier | | 408/59 |

FOREIGN PATENT DOCUMENTS

| | | | |
|---|---|---|---|
| CH | 666 643 A5 | | 7/1985 |
| DE | 10 2007 028 167 A1 | | 12/2008 |
| GB | 2084056 A | * | 4/1982 |
| JP | 2003311530 A | * | 11/2003 |
| WO | WO 2007093169 A2 | * | 8/2007 |

OTHER PUBLICATIONS two .jpg files converted to PDFs, showing the Barber Colman Reamer Handbook reference more clearly, submitted to the PTO on Aug. 16, 2011.*
Werkzeug Technik, Reiben MIT Hochster Prazision, Oct. 15, 2008, pp. 78 and 79.
Barber Colman Reamers Handbook, Barber-Colman Company, Rockford, Illinois, 1951, pp. 82 and 83.

* cited by examiner

*Primary Examiner* — Daniel Howell
(74) *Attorney, Agent, or Firm* — Larry R. Meenan

(57) ABSTRACT

An expandable reamer includes a shank portion, a cutting portion extending from the shank portion, and a tapered pin capable of being at least partially received in the cutting portion. The cutting portion includes a plurality of blades separated by flutes, and a tapered inner surface with threads. The tapered pin includes a tapered outer surface with threads and causes expansion or contraction of the cutting portion when the tapered pin is screwed or unscrewed into the cutting portion. In one embodiment, a coolant channel extends from a coolant cavity through a wall of the cutting portion to provide fluid to the blades during machining of through-holes. In another embodiment, the tapered pin includes a coolant passage in fluid communication with the coolant cavity to provide fluid to the blades during machining of blind holes.

11 Claims, 3 Drawing Sheets

EXPANDABLE MULTI-FLUTE REAMER WITH TAPERED PIN

FIELD OF THE INVENTION

The invention relates in general to a rotary cutting tool, and in particular, to an adjustable reamer with a tapered threaded pin for providing improved coolant and lubricant supply to the cutter head.

BACKGROUND OF THE INVENTION

Bore holes with very small tolerances, i.e., tolerances smaller than tolerance class IT6, is difficult to achieve with conventional reamers, such as solid carbide reamers or brazed carbide reamers. Therefore, one needs an adjustable reamer.

There are two kinds of adjustable reamers: 1) the single blade reamer with an adjustable insert, and 2) an expandable multi-flute reamer. Referring now to FIG. 6, a conventional expandable multi-flute reamer 100 has a shank 102, and a cutter head 104 with cutters 106. A conical screw 108 is screwed into the shank 102 such that a conical head 110 of the screw 108 contacts a conical wall 112 and causes expansion of the cutters 106. Coolant and lubricant is supplied by an axial channel 114 that axially extends through the shank 102. In an attempt to provide adequate coolant and lubricant to the cutters 106, a ring channel 116 is provided between the conical screw 108 and a wall 118 of the cutter head 104. Outlet channels 120 extend through the wall 118 of the cutter head 104 at an angle between thirty (30) and forty-five (45) degrees towards the front end of the cutter head 104.

It has been found that the shank 122 of the conical screw 108 interferes with the supply of the coolant and lubricant such that an optimum, strong supply of coolant and lubricant is not provided to the cutting head 104. In addition, the shank 122 of the conical screw 108 does not leave enough design space for proper placement of the coolant channels 116 to accurately supply the coolant and lubricant to the cutter head 104. Therefore, it is desirable to provide an adjustable reamer that overcomes the shortcomings of the prior art.

SUMMARY OF THE INVENTION

In one aspect of the invention, an expandable reamer comprises a shank portion; a cutting portion extending from the shank portion, the cutting portion including a plurality of blades separated by flutes, the cutting portion including a tapered inner surface with threads, the cutting portion further including at least one coolant channel extending from a coolant cavity through a wall of the cutting portion for providing a supply of coolant to the blades; and a tapered pin including a tapered outer surface with threads, the tapered pin capable of being at least partially received within the cutting portion, the tapered pin causing an expansion or contraction of the cutting portion when the tapered pin is screwed or unscrewed into the cutting portion, wherein a length of the tapered pin is such that the tapered pin does not extend into the cutting portion far enough to reach the at least one coolant channel, and therefore, does not interfere with the supply of coolant through the at least one coolant channel.

In another aspect of the invention, an expandable reamer having a longitudinal axis comprises a shank portion; a cutting portion extending from the shank portion, a cutting portion extending from the shank portion, the cutting portion including a plurality of blades separated by flutes, the cutting portion having a tapered inner surface with threads; and a tapered pin having a tapered outer surface with threads, at least a portion of the tapered pin being threadingly received within the cutting portion, the tapered pin causing an expansion or contraction of the cutting portion when the tapered pin is screwed or unscrewed into the cutting portion, the tapered pin further including a coolant passage to allow a supply of fluid to pass therethrough, wherein the tapered pin does not extend into the cutting portion far enough so as to reach the at least one coolant channel, and therefore, does not interfere with the supply of coolant through the at least one coolant channel.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
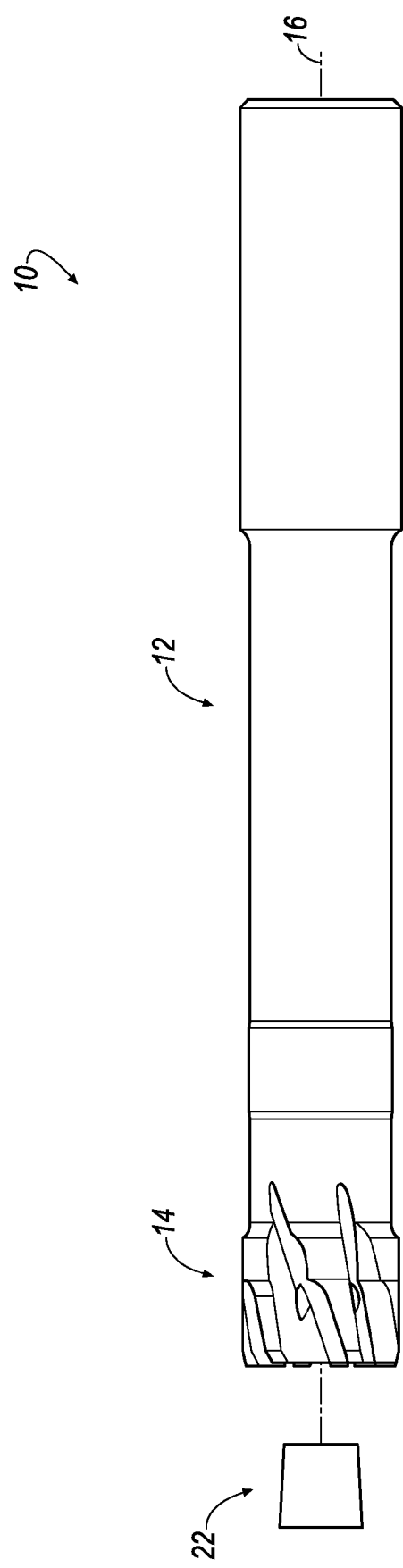
FIG. 1 is a side view of an expandable reamer with a solid tapered pin in accordance with an embodiment of the invention.
Figure 2:
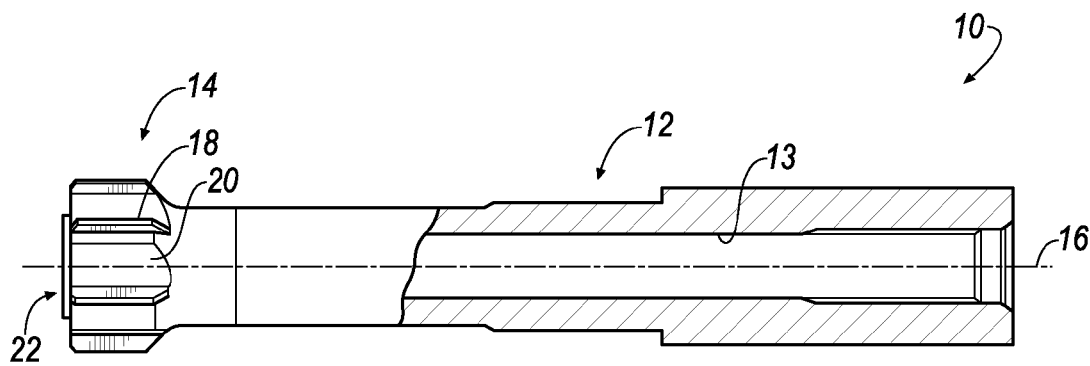
FIG. 2 is a partial cutaway view of the expandable reamer of FIG. 1.

Referring now to FIGS. 1-4, an expandable reamer 10 includes an annular shank portion 12, an annular cutting portion 14 extending from the shank portion 12 and a longitudinal axis 16. The shank portion 12 is capable of being received in a conventional machine tool holding chuck (not shown). Both the shank portion 12 and the cutting portion 14 include a longitudinal coolant cavity 13 for allowing coolant and lubricant to pass therethrough. The overall shape of the cutting portion 14 may be, but is not limited to, a cylindrical shape or a frustoconical shape. The cutting portion 14 includes a plurality of blades 18 separated by flutes 20 extending the length of the cutting portion 14. In the illustrated embodiment, the expandable reamer 10 has a total of six (6) blades 18 and flutes 20. However, it will be appreciated that the invention is not limited by the number of blades and flutes, and that the invention can be practiced with a fewer or a greater number of blades and flutes.

The expandable reamer 10 also includes a tapered pin 22 having a tapered outer surface 24 with threads 26. The cutting portion 14 includes a tapered inner surface 28 with corresponding threads 30. Expansion (or contraction) of the blades 18 is caused by the outer surface 24 of the conical tapered pin 22 engaging the tapered inner surface 28 of the cutting portion 14 when the tapered pin 22 is screwed (or unscrewed) into the cutting portion 14 of the reamer 10. The tapered pin 22 has a length, L, along the longitudinal axis 16 that depends on the cutting diameter of the reamer 10 and has a ratio of a cutting diameter of the reamer 10 to a length of the tapered pin 22 is about 2:1. For example, the tapered pin 22 has a length, L, of about 10 mm for a cutting diameter of about 20 mm. It is noted that the length, L, of the tapered pin 22 is such that the tapered pin 22 does not extend into the cutting portion 14 far enough to reach the coolant channel 32, and therefore, does not interfere with the supply of fluid, such as coolant, lubricant, and the like, flowing through the coolant channel 32.

It will be appreciated that the pitch of the threads 26, 30 of the tapered pin 22 and the inner surface 28 determine the amount of expansion (or contraction) per revolution when the tapered pin 22 is screwed into (or out of) the reamer 10. For a fine adjustment on the magnitude of expansion of the blades 18, the smaller the pitch, and vice versa. In one example, the threads 26, 30 have a pitch in a range between about 0.50 mm to about 0.75 mm to provide a fine adjustment on the amount of expansion (or contraction) of the blades 18. In one embodiment, the cutting portion 14 of the reamer 10 expands (or contracts) in the range of about 0.0005" to about 0.0012" per revolution of the tapered pin 22.

In addition, the taper angle of the outer surface 24 of the tapered pin 22 and the inner surface 28 of the cutting portion 14 determines the amount of expansion (or contraction) per revolution when the tapered pin 22 is screwed into (or out of) the reamer 10. For a fine adjustment, the smaller the taper angle. In one example, the tapered pin 22 has a taper angle of about 10:1 (2 degrees, 52 seconds) with respect to the longitudinal axis 16. A hexagonal recess 31 is provided in the head of the tapered pin 22 to provide a means for a tool to apply tightening and loosening torque to the tapered pin 22. It will be appreciated that the invention is not limited by the shape of the recess 31, and that the recess 31 can be any desirable shape to allow a tool to apply torque to the tapered pin 22.

Figure 3:
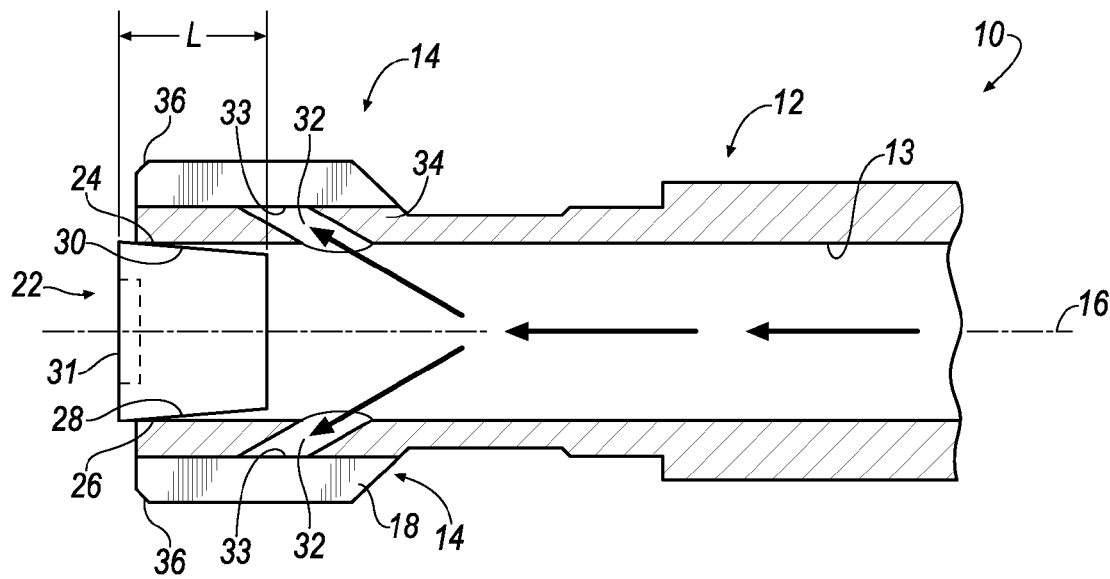
FIG. 3 is a cross-sectional view of the expandable reamer of FIG. 1 in accordance with an embodiment of the invention.
Figure 4:
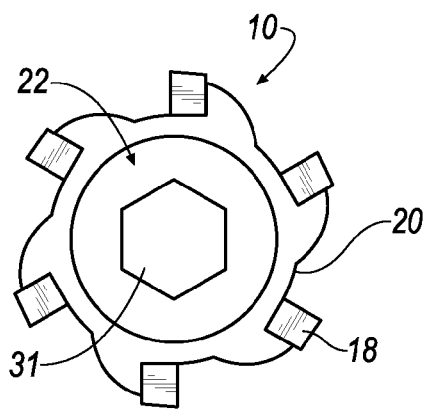
FIG. 4 is a front view of the expandable reamer of FIG. 1.

The expandable reamer 10 includes at least one coolant channel 32 extending from the coolant cavity 14, through a wall 34 of the cutting portion 14, and to an outlet 33 for providing fluid, such as coolant, lubricant, and the like, to the blades 18 of the reamer 10 (as indicated by the arrow in FIG. 3). In one embodiment, at least one coolant channel 32 is located within each flute 20 toward a front end of the cutting portion 14 at an angle in the range between about fifteen (15) degrees and about sixty (60) degrees with respect to the longitudinal axis 16. In this manner, the discharged coolant and lubricant is directed upstream of a leading edge 36 of each blade 18. However, it will be appreciated that the invention is not limited by the angle of the coolant channel 32, and that the invention can be practiced with any desirable angle that provide optimum supply of coolant and lubricant to the blades 18. Unlike conventional expandable reamer designs that utilize a threaded screw, the tapered pin 22 of the expandable reamer 10 does not interfere with the supply of fluid, such as coolant, lubricant, and the like, through the coolant cavity 13 and the coolant channel 32. As a result, an optimum, strong supply of coolant is provided to the blades 18 of the expandable reamer 10.

Figure 5:
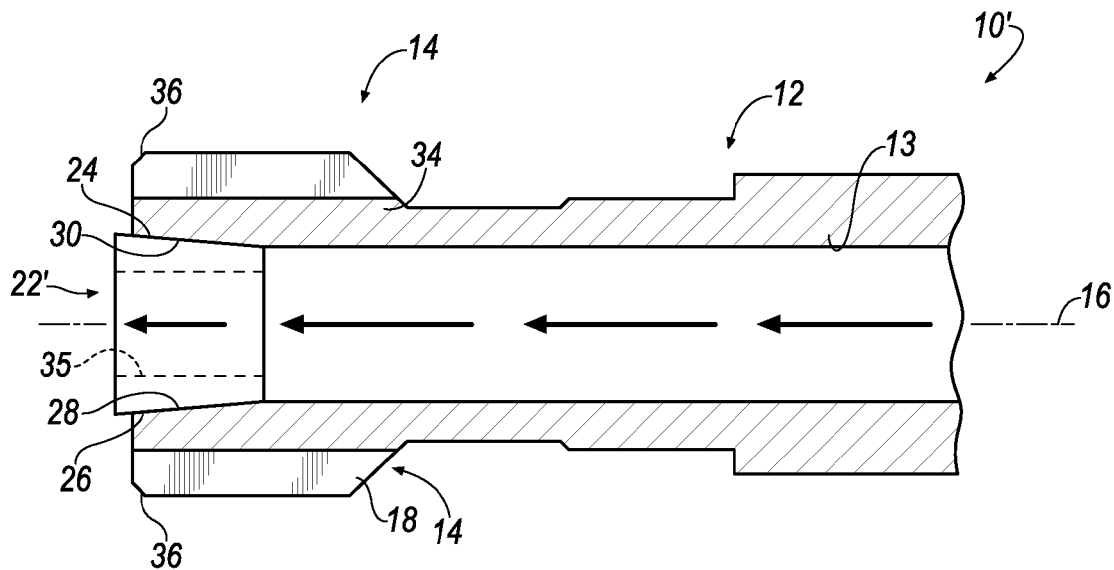
FIG. 5 is a cross-sectional view of an expandable reamer having a tapered pin with a coolant passage in accordance with an embodiment of the invention.
Figure 6:
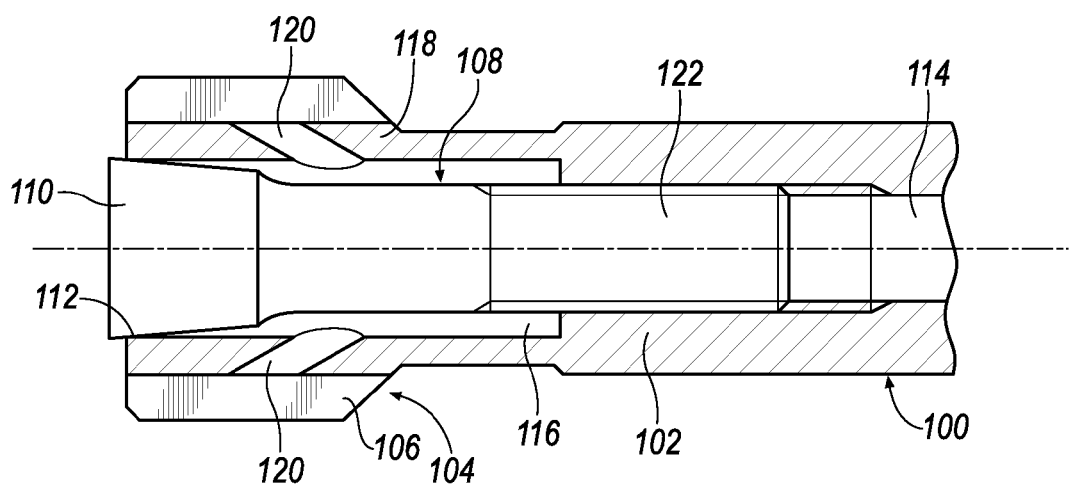
FIG. 6 is a cross-sectional view of a conventional expandable reamer with a conical screw.

As described above, the tapered pin 22 is solid and is particularly suitable for an expandable reamer 10 having helical flutes 20 for through hole machining operations. Referring now to FIG. 5, another embodiment of an expandable reamer 10' is shown and described. The expandable reamer 10' is identical to the expandable reamer 10, except that a tapered pin 22' includes a coolant passage 35 to allow the supply of fluid, such as coolant, lubricant, and the like, to pass therethrough. In this embodiment, the at least one coolant channel 32 and outlet 33 are omitted and the entire supply of fluid passes through the coolant passage 35 of the tapered pin 22'. The coolant passage 35 may be hexagonal in shape, for example, to provide a means for a tool to apply tightening and loosening torque to the tapered pin 22,' similar to the tapered pin 22. In this embodiment the expandable reamer 10' is particularly suitable with straight flutes 20 for blind hole machining operations.

The patents and publications referred to herein are hereby incorporated by reference.

Having described presently preferred embodiments the invention may be otherwise embodied within the scope of the appended claims.

What is claimed is:

1. An expandable reamer having a longitudinal axis, comprising:
   a shank portion;
   a cutting portion extending from the shank portion, the cutting portion including a plurality of blades separated by flutes, the cutting portion including a tapered inner surface with threads, the cutting portion further including at least one coolant channel extending from a coolant cavity through a wall of the cutting portion for providing a supply of fluid to the blades; and
   a tapered pin including a tapered outer surface with threads, the tapered pin capable of being at least partially received within the cutting portion, the tapered pin causing an expansion or contraction of the cutting portion when the tapered pin is screwed or unscrewed into the cutting portion,
   wherein a length of the tapered pin is such that the tapered pin does not extend into the cutting portion far enough to reach the at least one coolant channel, and therefore, does not interfere with the supply of fluid through the at least one coolant channel.

2. The reamer according to claim 1, wherein the inner surface of the cutting portion and the outer surface of the tapered pin have a taper angle of about 1:10 with respect to the longitudinal axis.

3. The reamer according to claim 1, wherein at least one coolant channel is located within each flute.

4. The reamer according to claim 1, wherein the at least one coolant channel is formed at an angle in a range between about fifteen (15) degrees and about sixty (60) degrees with respect to the longitudinal axis.

5. The reamer according to claim 1, wherein the threads of the inner surface of the cutting portion and the threads on the outer surface of the tapered pin have a pitch in a range between about 0.50 mm to about 0.75 mm.

6. The reamer according to claim 1, wherein a ratio of a cutting diameter of the reamer to the length of the tapered pin is about 2:1.

7. The reamer according to claim 1, wherein the flutes are helical flutes.

8. An expandable reamer having a longitudinal axis, comprising:
   a shank portion;
   a cutting portion extending from the shank portion, the cutting portion including a plurality of blades separated by flutes, the cutting portion having a tapered inner surface with threads; and
   a tapered pin having a tapered outer surface with threads, at least a portion of the tapered pin being threadingly received within the cutting portion, the tapered pin causing an expansion or contraction of the cutting portion when the tapered pin is screwed or unscrewed into the cutting portion, the tapered pin further including a coolant passage to allow a supply of fluid to pass therethrough,
   wherein the inner surface of the cutting portion and the outer surface of the tapered pin are formed at a taper angle of about 1:10 with respect to the longitudinal axis.

9. The reamer according to claim 8, wherein the flutes are straight flutes.

10. The reamer according to claim 8, wherein the threads of the inner surface of the cutting portion and the threads on the outer surface of the tapered pin have a pitch in a range between about 0.50 mm to about 0.75 mm.

11. The reamer according to claim 8, wherein a ratio of a cutting diameter of the reamer to a length of the tapered pin is about 2:1.

* * * * *